Dec. 17, 1935.  A. RENFREW  2,024,389
MANUFACTURE OF LAMINATED NONSPLINTERING GLASS
Filed March 16, 1933
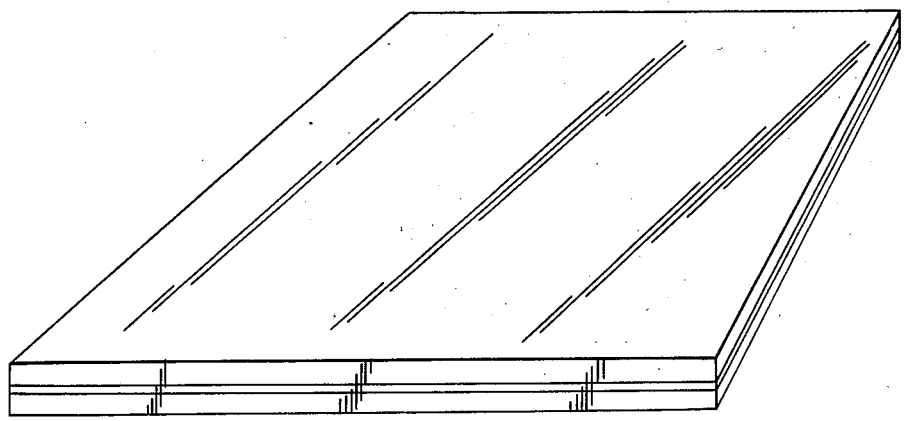
INVENTOR.
Archibald Renfrew
BY
ATTORNEY.

Patented Dec. 17, 1935

2,024,389

UNITED STATES PATENT OFFICE 2,024,389

MANUFACTURE OF LAMINATED NONSPLINTERING GLASS

Archibald Renfrew, Giffnock, Scotland, assignor to Imperial Chemical Industries Limited, a corporation of Great Britain Application March 16, 1933, Serial No. 661,172
In Great Britain March 22, 1932

11 Claims. (Cl. 49—81.5)

This invention relates to a process for preparing laminated non-splintering glass of the kind containing a tough and transparent interlayer of a polymerized unsaturated organic compound, or the product of the interpolymerization of unsaturated organic compounds.

It has been proposed to make laminated glass from fully polymerized unsaturated organic compounds dissolved in a volatile organic solvent such for instance as ethyl acetate, and to pour the solution on to sheets of glass, evaporate the solvent and thereafter to unite two such coated glasses by heat and pressure, with or without a prior treatment in a softening bath.

It has also been proposed to make an interlayer sheet from the fully polymerized unsaturated organic compound, usually with the aid of solvents, and to cement this between glass sheets.

It has further been proposed to form an interlayer of unpolymerized or partly polymerized unsaturated compounds and to complete the polymerization of the interlayer while it is in position between the glass sheets, for instance by exposing the whole to ultra-violet light.

The principal object of the present invention is to avoid on the one hand the inconvenience of first fully polymerizing or interpolymerizing the unsaturated organic compound or compounds to a substantially solid form, for instance a mass of the shape of the polymerization vessel, and then forming the solid polymer into the shape of an interlayer, with or without the aid of solvents, while on the other hand avoiding the necessity for an after-polymerization of the interlayer between the glass sheets.

Other objects and advantages of the invention will be apparent as it is better understood by reference to the following specification in which its details and preferred embodiments are described.

The invention is based upon the discovery that the syrups which result from the incomplete polymerization or interpolymerization of volatile unsaturated organic compounds, that is to say syrups in which both unpolymerized and polymerized forms of the material are present, behave like solutions of the corresponding fully polymerized compounds in volatile solvents, and that these syrups provide particularly suitable materials for the formation of laminated glass interlayers. For the sake of simplicity the invention is hereinafter described with special reference to syrups comprising certain specific incompletely polymerized unsaturated organic compounds, but it will be understood that the invention is not limited to these materials. The invention contemplates the employment generally of unsaturated organic compounds capable of polymerization to resinous bodies adapted for use as an interlayer in laminated glass. Such compounds include, for example, vinyl esters and esters of acrylic or methacrylic acid, as well as mixtures of two or more polymerizable organic compounds which, in accordance with the invention, are employed in the form of syrups of the product of partial interpolymerization. The production of certain interpolymers of this kind is disclosed in the copending application of Rowland Hill, Serial No. 645,318, filed December 1, 1932.

In carrying the invention into effect, in one form, a syrup resulting from the incomplete polymerization of vinyl acetate is evenly spread on to both of the glass sheets, which may, if desired, be first treated with a layer of a cementing substance, and the sheets are then heated gradually, or in stages, at temperatures below the boiling point of the unpolymerized vinyl acetate until they are almost or quite free from unpolymerized substance. The temperature should not be raised too rapidly or above the boiling point of the unpolymerized substance, otherwise bubbles are apt to form in the coatings. After removal of the volatile matter, however, the temperature may be further raised if desired. The two sheets are then positioned with the polymerized vinyl acetate coatings together and are finally united by heat and pressure. If desired, the coated sheets from which the unpolymerized vinyl acetate has been evaporated may be treated in a bath containing a non-volatile softener, such as dibutyl phthalate, etc., before they are united.

According to another form of the invention, the syrup may be converted into sheet form, for instance by pouring it on to the surface of a suitable liquid or solid to which the polymerized substance does not adhere, and which does not dissolve it. The whole may then be heated gradually, or in stages, at temperatures below the boiling-point of the unpolymerized compound until practically all of it has evaporated. The temperature may then be further raised until any odor of the unpolymerized compound can no longer be detected. The sheet of polymerized vinyl acetate is then removed and may then be inserted between glass sheets, coated, if desired, with a cementing substance, and subjected to heat and pressure in known manner. If desired, non-volatile softening agents may be present in the syrup.

The invention is illustrated, but not limited, by the following examples. The parts are by weight.

*Example 1.*—Vinyl acetate is polymerized by heat in the presence of 0.5% benzoyl peroxide to give a thin syrup containing 30% of volatile matter (unpolymerized vinyl acetate) and having a viscosity of 28 cgs. units, and the resulting syrup is extruded through a slot by means of compressed air on to two prepared sheets of glass. The coating is conveniently 0.025 inch thick. The unpolymerized vinyl acetate is removed by slow evaporation at a gradually increasing temperature. The sheets are allowed to cool to room temperature, then treated with dibutyl phthalate, and are then pressed together under a pressure of 5 lb. per sq. in. for 20 minutes at about 50° C.

*Example 2.*—A thick syrupy mass prepared by incomplete polymerization of methyl acrylate is spread on to glass sheets by means of a spreading knife, such as that used in the spreading of "dope" on fabric in the manufacture of artificial leathercloth. The unpolymerized methyl acrylate is removed by slow evaporation at a gradually increasing temperature. Once cold, the sheets are united as in Example 1.

Various changes may be made in the method described without departing from the invention or sacrificing any of the advantages thereof.

I claim:

1. A process for the manufacture of laminated glass having as a transparent interlayer the product of the polymerization of an unsaturated organic compound which includes the steps of effecting partial polymerization of the unsaturated organic compound until a syrup is formed, causing the syrup to assume the form of a sheet, substantially completely removing unsaturated organic compound by evaporation at a temperature below its boiling point, treating the resultant sheet with a softening agent, interposing the sheet between two sheets of glass and uniting it therewith.

2. A process for the manufacture of laminated glass having as a transparent interlayer the product of the polymerization of an unsaturated organic compound which includes the steps of effecting partial polymerization of the unsaturated organic compound until a syrup is formed, causing the syrup to assume the form of a sheet, substantially completely removing unpolymerized unsaturated organic compound by evaporation, interposing the resultant sheet between two sheets of glass, and uniting it therewith.

3. A process for the manufacture of laminated glass having as a transparent interlayer the product of the polymerization of an unsaturated organic compound which includes the steps of effecting partial polymerization of the unsaturated organic compound until a syrup is formed, causing the syrup to assume the form of a sheet, substantially completely removing unpolymerized unsaturated organic compound by evaporation at a temperature below its boiling point, interposing the resultant sheet between two sheets of glass, and uniting it therewith.

4. A process for the manufacture of laminated glass having as a transparent interlayer the product of the polymerization of an unsaturated organic compound which includes the steps of effecting partial polymerization of the unsaturated organic compound until a syrup is formed, causing the syrup to assume the form of a sheet, substantially completely removing unpolymerized unsaturated organic compound by evaporation, treating the resultant sheet with a softening agent, interposing the sheet between two sheets of glass, and uniting it therewith.

5. A process for the manufacture of laminated glass having, as a transparent interlayer, the product of the polymerization of an unsaturated organic compound which includes the steps of effecting partial polymerization of the unsaturated organic compound until a syrup is formed, spreading said syrup on one surface of a sheet of glass, substantially completely removing unpolymerized unsaturated organic compound by evaporation, and pressing against the side of the sheet of glass thus coated a second sheet of glass to give a laminated glass.

6. Process as in claim 2, wherein the syrup comprises the product of incomplete polymerization of at least two polymerizable unsaturated organic compounds.

7. A process for the manufacture of laminated glass having as a transparent interlayer the product of the polymerization of an ester of methacrylic acid which includes the steps of effecting partial polymerization of said ester until a syrup is formed, causing the syrup to assume the form of a sheet, substantially completely removing unpolymerized ester by evaporation at a temperature below its boiling point, treating the resultant sheet with a softening agent, interposing the sheet beween two sheets of glass, and uniting it therewith.

8. A process for the manufacture of laminated glass having as a transparent interlayer the product of the polymerization of an ester of methacrylic acid which includes the steps of effecting partial polymerization of said ester until a syrup is formed, causing the syrup to assume the form of a sheet, substantially completely removing unpolymerized ester by evaporation, interposing the resultant sheet between two sheets of glass, and uniting it therewith.

9. A process for the manufacture of laminated glass having as a transparent interlayer the product of the polymerization of an ester of methacrylic acid which includes the steps of effecting partial polymerization of said ester until a syrup is formed, causing the syrup to assume the form of a sheet, substantially completely removing unpolymerized ester by evaporation at a temperature below its boiling point, interposing the resultant sheet between two sheets of glass, and uniting it therewith.

10. A process for the manufacture of laminated glass having as a transparent interlayer the product of the polymerization of an ester of methacrylic acid which includes the steps of effecting partial polymerization of said ester until a syrup is formed, causing the syrup to assume the form of a sheet, substantially completely removing unpolymerized ester by evaporation, treating the resultant sheet with a softening agent, interposing the sheet between two sheets of glass, and uniting it therewith.

11. A process for the manufacture of laminated glass having, as a transparent interlayer, the product of the polymerization of an ester of methacrylic acid which includes the step of effecting partial polymerization of said ester until a syrup is formed, spreading said syrup on one surface of a sheet of glass, substantially completely removing unpolymerized ester by evaporation, and pressing against the side of the sheet of glass thus coated a second sheet of glass to give a laminated glass.

ARCHIBALD RENFREW.